United States Patent [19]

Williams

[11] Patent Number: 5,510,986
[45] Date of Patent: Apr. 23, 1996

[54] METHOD AND APPARATUS FOR CONTROLLING AN ACTIVE SUSPENSION SYSTEM

[75] Inventor: Daniel E. Williams, Stuart, Fla.

[73] Assignee: TRW Inc., Lyndhurst, Ohio

[21] Appl. No.: 213,104

[22] Filed: Mar. 14, 1994

[51] Int. Cl.⁶ .................................................... F16F 9/46
[52] U.S. Cl. .................................................... 364/424.05
[58] Field of Search ..................... 364/424.05; 280/707, 280/709, 714, 703, 772, 840

[56] References Cited

U.S. PATENT DOCUMENTS

| | | | |
|---|---|---|---|
| 4,625,993 | 12/1986 | Williams et al. | 280/707 |
| 4,761,022 | 8/1988 | Ohashi et al. | 280/772 |
| 4,801,155 | 1/1989 | Fukushima et al. | 280/707 |
| 5,015,009 | 5/1991 | Ohyama et al. | 280/772 |
| 5,071,157 | 12/1991 | Majeed | 280/707 |
| 5,088,762 | 2/1992 | Fukuyama et al. | 280/707 |
| 5,096,219 | 3/1992 | Hanson et al. | 280/707 |
| 5,217,246 | 6/1993 | Williams et al. | 280/707 |
| 5,231,583 | 7/1993 | Lizell | 364/424.05 |
| 5,291,406 | 3/1994 | Williams et al. | 364/424.05 |
| 5,295,074 | 3/1994 | Williams | 364/424.05 |
| 5,297,045 | 3/1994 | Williams et al. | 364/424.05 |
| 5,324,067 | 6/1994 | Kallenbach et al. | 280/707 |
| 5,324,069 | 6/1994 | Ogawa | 280/707 |
| 5,346,242 | 9/1994 | Karnopp | 280/707 |
| 5,369,582 | 11/1994 | Gorny et al. | 364/424.05 |
| 5,396,973 | 3/1995 | Schwemmer et al. | 188/299 |

*Primary Examiner*—Kevin J. Teska
*Assistant Examiner*—Stephen J. Walder, Jr.
*Attorney, Agent, or Firm*—Tarolli, Sundheim, Covell, Tummino & Szabo

[57] ABSTRACT

A force actuator (11) is connected between a vehicle body (15) and each vehicle wheel (16). A position sensor (66) senses displacement between the vehicle body and each vehicle wheel and provides a position signal (67) indicative thereof. An acceleration sensor (60) senses vertical inertial acceleration of the vehicle body relative to ground at each vehicle wheel and provides an acceleration signal (61) indicative of vertical inertial acceleration of the vehicle body at each vehicle wheel. A controller (70) including a digital signal processor (80) determines a velocity signal based on each acceleration signal. The controller determines a plurality of modal forces including heave, pitch, and roll modal forces which act on the vehicle body. The plurality of modal forces vary as a function of the position and velocity signals at the vehicle wheels. A force actuator control signal (94) at each vehicle wheel is produced which varies as a function of the plurality of modal forces. A drive circuit (95) processes the force actuator signal at each wheel and applies the processed force actuator control signal (96) at each vehicle wheel to the associated force actuator.

28 Claims, 5 Drawing Sheets

METHOD AND APPARATUS FOR CONTROLLING AN ACTIVE SUSPENSION SYSTEM

BACKGROUND OF THE INVENTION

1. Technical Field

The present invention relates to a vehicle active suspension system, and is particularly directed to a method and apparatus for controlling the active suspension system.

2. Background Art

Vehicle active suspension systems are well known in the art. Such suspension systems have as their goal the control of the relative motion between the sprung mass (the vehicle chassis) and the unsprung mass (the suspension arms, wheels, tires, etc.) of the vehicle. An active suspension system may comprise (i) an actuator connected between the vehicle chassis and a vehicle wheel, (ii) a plurality of remote sensors which provide sensor signals indicative of road and vehicle conditions encountered or to be encountered by the vehicle, and (iii) a control unit which processes the sensor signals and provides a number of control signals to control operation of the actuator. The control unit processes the sensor signals in accordance with a preprogrammed procedure stored in a memory associated with the control unit.

Such a known active suspension system is disclosed in U.S. Pat. No. 4,625,993. In U.S. Pat. No. 4,625,993, a control system generates modal force signals in response to signals from transducers sensing actuator load and actuator piston displacement at each corner of a vehicle. The modal force signals represent forces corresponding to the heave, pitch, roll and warp modes of vehicle movement. The control system generates control signals to control electro-hydraulic servo control valves associated with the actuators at the corners of the vehicle to effect piston velocity and thereby desired vehicle attitude. The control signals can be modified by signals representing vehicle speed and lateral and longitudinal acceleration and under selective control of the driver of the vehicle.

Another known active suspension system is disclosed in U.S. Pat. No. 5,217,246. In U.S. Pat. No. 5,217,246, a microprocessor produces a plurality of modal forces which are based on measured heave forces and measured unsprung mass accelerations. The microprocessor then produces modified values of the modal forces based on measured actuator displacement values. The modified values of the modal forces may be further processed by the microprocessor to produce a demanded output of an actuator operatively connected between a vehicle body and a vehicle wheel. The actuator is operated to move the vehicle wheel up and down relative to the vehicle body as necessary to provide a desired "ride feel" and "handling characteristic" of the vehicle.

SUMMARY OF THE INVENTION

In accordance with one aspect of the present invention, an apparatus is provided for controlling a force actuator connected between a vehicle body and each vehicle wheel. The apparatus comprises a position sensor for sensing displacement between the vehicle body and each vehicle wheel and for providing a position signal indicative thereof. The apparatus further comprises an acceleration sensor for sensing vertical inertial acceleration of the vehicle body relative to ground at each vehicle wheel and for providing an acceleration signal indicative of vertical inertial acceleration of the vehicle body at each vehicle wheel. The apparatus also comprises processing means including means for determining a velocity signal based on each acceleration signal. The processing means includes means for processing the position and velocity signals at the vehicle wheels to provide a force actuator control signal at each vehicle wheel which varies as a function of the position and velocity signals at the vehicle wheels. Means is provided for applying the force actuator control signal at each vehicle wheel to the associated force actuator to control operation of the force actuator.

Specifically, the processing means determines a plurality of modal forces including the heave, pitch, and roll modal forces which vary as a function of the position and velocity signals at the vehicle wheels and which act on the vehicle body. The processing means then produces a force actuator control signal at each vehicle wheel which varies as a function of the plurality of modal forces and thereby as a function of the position and velocity signals at the vehicle wheels.

A closed loop arrangement is provided for enabling the force actuator control signal at each vehicle wheel to be regulated during its operation. The closed loop arrangement includes a steering rack displacement sensor which senses steering input and provides a steering signal indicative thereof, a speed sensor which senses forward speed of the vehicle relative to ground and provides a speed signal indicative thereof, and a yaw rate sensor which senses yaw rate of the vehicle and provides a yaw rate signal indicative thereof. The processing means determines a desired yaw rate signal which varies as a function of the steering signal and the speed signal. The processing means determines a difference signal between the sensed yaw rate signal and the desired yaw rate signal. The difference signal is then processed such that the force actuator control signal at each wheel varies as a function of the difference signal.

Further, a longitudinal acceleration sensor senses longitudinal acceleration of the vehicle body relative to ground and provides a longitudinal acceleration signal indicative thereof, and a lateral acceleration sensor senses lateral acceleration of the vehicle body relative to ground and provides a lateral acceleration signal indicative thereof. The processing means processes the longitudinal acceleration signal and the lateral acceleration signal to provide a longitudinal acceleration compensation force term and a lateral acceleration compensation force term, respectively, at each vehicle wheel. The longitudinal acceleration compensation force term and the lateral acceleration force term are processed to influence the force actuator control signal at the associated vehicle wheel.

In accordance with another aspect of the present invention, a method is provided for controlling a vehicle suspension system having a force actuator connected between a vehicle body and each vehicle wheel. The vehicle has a pair of front wheels and a pair of rear wheels. The method comprises the steps of sensing displacement between the vehicle body and each vehicle wheel and providing a position signal indicative thereof, and sensing vertical inertial acceleration of the vehicle body relative to ground at each vehicle wheel and providing an acceleration signal indicative of vertical inertial acceleration of the vehicle body at each vehicle wheel. The method further comprises the steps of determining a velocity signal based on each acceleration signal, and determining a first roll moment on the rear of the vehicle and a second roll moment on the front of the vehicle. The method also comprises the step of providing a force actuator control signal for each vehicle wheel. The force actuator control signals for the rear wheels vary as a function of the roll moment on the rear wheels of the vehicle. The force actuator control signals for the front wheels vary as a function of the roll moment on the front wheels of the vehicle. The method further comprises the steps of applying the force actuator control signal for each vehicle wheel to the associated force actuator to control operation of the force actuator, and continuously changing the roll resisting force between the front and rear of the vehicle as the force actuator control signals are being applied.

Specifically, roll modal forces which act on the vehicle body are determined. The roll modal forces vary as a function of the position and velocity signals at the vehicle wheels. The force actuator control signal at each vehicle wheel varies as a function of the roll modal forces and thereby as a function of the sensed position and velocity signals at the vehicle wheels.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

The present invention is directed to a control apparatus for controlling a number of force actuators in a vehicle active suspension system in response to a plurality of remote sensor signals indicative of road and vehicle conditions encountered or to be encountered by the vehicle. The control apparatus follows a sequence of control steps in accordance with the present invention to provide a force control signal to each force actuator. The specific construction of the force actuators may vary.

Figure 1:
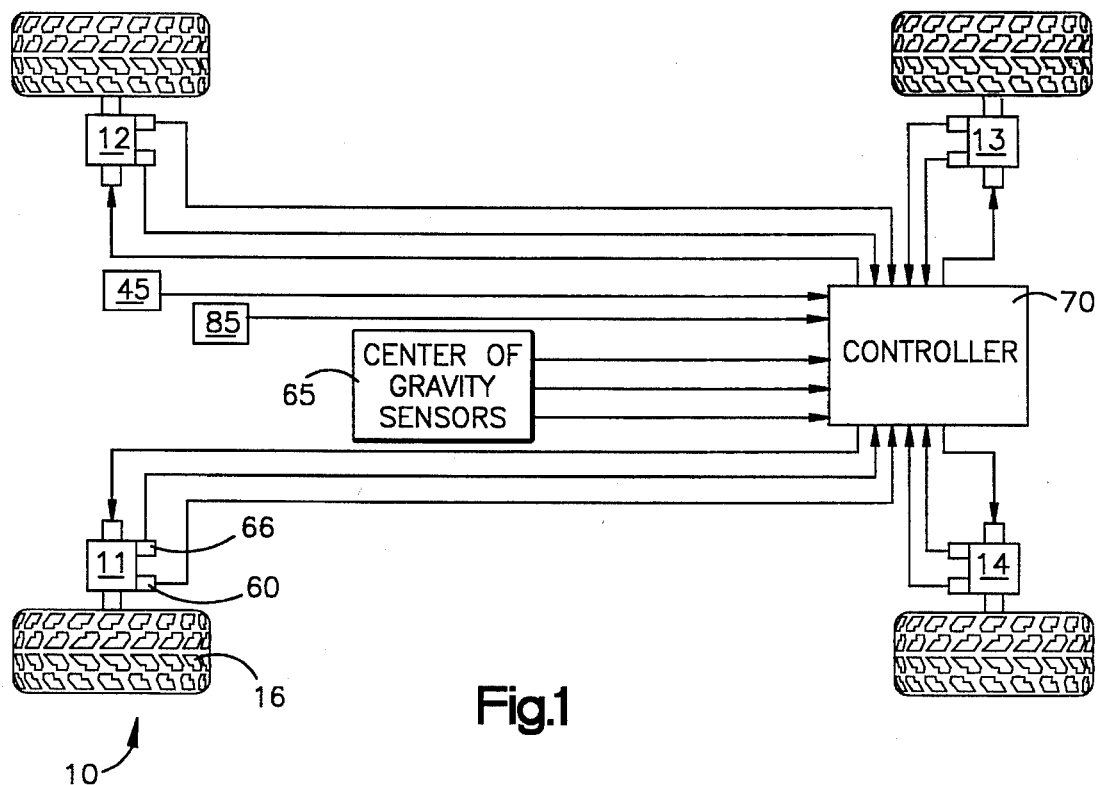
FIG. 1 is a schematic block diagram of a vehicle active suspension system incorporating a control apparatus constructed in accordance with the present invention.

As representative of the present invention, a control apparatus constructed according to the present invention is embodied in a vehicle active suspension system 10 having four force actuators 11, 12, 13, 14 as illustrated in FIG. 1. Each of the force actuators 11, 12, 13, 14 is connectable between relatively movable parts of the vehicle, such as between the vehicle body and a vehicle wheel, for damping relative movement between the parts. One force actuator is associated with each wheel of the vehicle. Also, one coil spring (not shown) is associated with each wheel of the vehicle.

Figure 2:
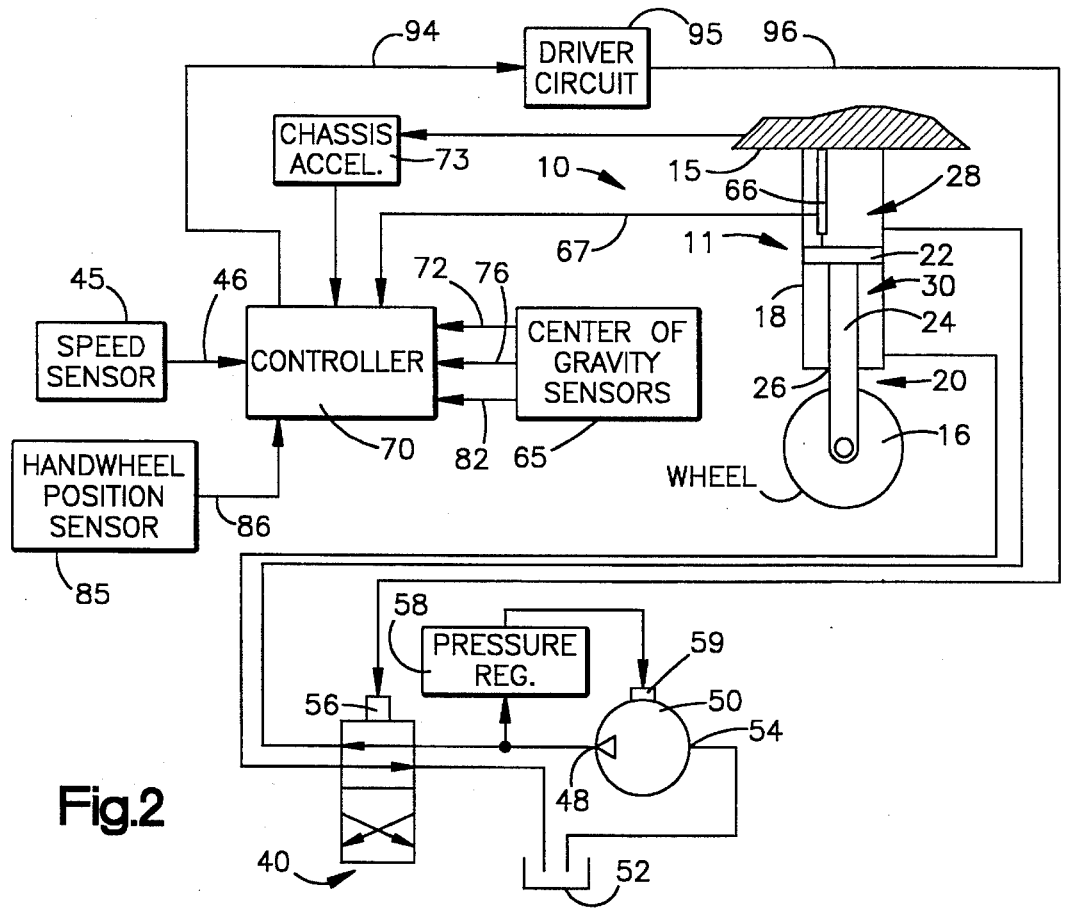
FIG. 2 is a schematic diagram of a portion of the vehicle active suspension system of FIG. 1.

The vehicle active suspension system 10 shown in FIG. 1 includes four corners corresponding to the four wheel corners of the vehicle. Throughout this disclosure, the structure and operation of only one corner is described, it being understood that the structure and operation of the other three corners is similar. In the corner shown in FIG. 2, the force actuator 11 operatively connects the sprung mass 15, i.e., the chassis or vehicle body, to its associated unsprung mass 16, i.e., the wheel upon which that corner's tire is mounted. Although not shown, a parallel load coil spring is operatively connected between the chassis 15 and the wheel 16.

The force actuator 11 includes a cylindrical housing 18 connected to the chassis 15. A piston 20 is telescopically received in the housing 18. The piston 20 includes a piston head 22 and a piston rod 24. The piston rod end extends through one end 26 of the cylindrical housing 18 and is connected to the wheel 16. The piston head 22 divides the cylindrical housing 18 into two variable volume fluid chambers 28, 30.

The force actuator 11 may be either an equal area strut or an unequal area strut. In an equal area strut, the surface area of the side of the piston head 22 facing the chamber 28 is equal to the surface area of the side of the piston head 22 facing the chamber 30. In an unequal area strut, the surface area of the side of the piston head 22 facing the chamber 28 is not equal to the area of the surface of the piston head 22 facing the chamber 30. The structure and operation of both unequal area struts and equal area struts are well known in the art and are, therefore, not described in detail herein.

Each of the chambers 28, 30 is in fluid communication with a spool valve 40. The valve 40 is in fluid communication with an output port 48 of a variable displacement swash plate pump 50 and a fluid reservoir 52. An input port 54 of the pump 50 is in fluid communication with the reservoir 52. The valve 40 includes a torque motor 56 for controlling operation of the valve 40 and, in turn, fluid communication between the pump 50 and reservoir 52 with the chamber 28 and the chamber 30. This valve arrangement permits fluid pressure from the pump 50 to communicate with the chamber 28 and fluid in chamber 30 to communicate with the reservoir 52 when it is desired to drive the wheel 16 downward relative to the chassis 15. Similarly, the valve 40 permits fluid pressure from the pump 50 to communicate with the chamber 30 and fluid from the chamber 28 to communicate with the reservoir 52 when it is desired to drive the wheel 16 upward relative to the chassis 15.

When it is desired to maintain the relative position between the chassis 15 and the wheel 16 fixed, the valve 40 is positioned so as to block fluid communication of the chambers 28 and 30 from either the pump 50 or the reservoir 52. The pump pressure is controlled so as to maintain a substantially constant output pressure. To accomplish this, the output port 48 of the pump 50 is connected to a pressure regulator 58. The pressure regulator 58 is connected to a pump swash plate control 59. The pressure regulator 58 regulates the output pressure of the pump 50 by controlling pump displacement.

An accelerometer 60 is operatively connected to the chassis 15. The accelerometer 60 provides an electric signal on line 61 indicative of the amount of vertical inertial acceleration of the chassis 15 relative to ground. A displacement sensor 66 is operatively connected between the housing 18 and the piston 20 and provides an electric signal on line 67 indicative of the displacement of the piston 20 relative to the housing 18. The electric signal on line 67 from the displacement sensor 66 is, in turn, indicative of the position of the wheel 16 relative to the chassis 15. The displacement of the piston 20 relative to the housing 18 and the position of the wheel 16 relative to the chassis 15 are all referred to as actuator displacement. The displacement sensor 66 may take any of several known forms such as an LVDT or LVIT sensor.

A vehicle forward speed sensor 45 provides an output signal on line 46 having a frequency proportional to vehicle forward speed. Signal processing circuitry located within the controller 70 transforms the frequency output signal of the vehicle speed sensor 45 into a proportional voltage signal.

A steering rack displacement sensor 85 provides a DC output signal on line 86 corresponding to the actual position of the handwheel of the vehicle. Preferably, the steering rack displacement sensor 85 comprises a potentiometer which scales the output signal for a 2.5 Vdc when the handwheel is in its null position. The scaled output signal of the steering rack displacement sensor 85 can swing between 0 Vdc and 5.0 Vdc corresponding to the full travel of the handwheel.

Figure 3:
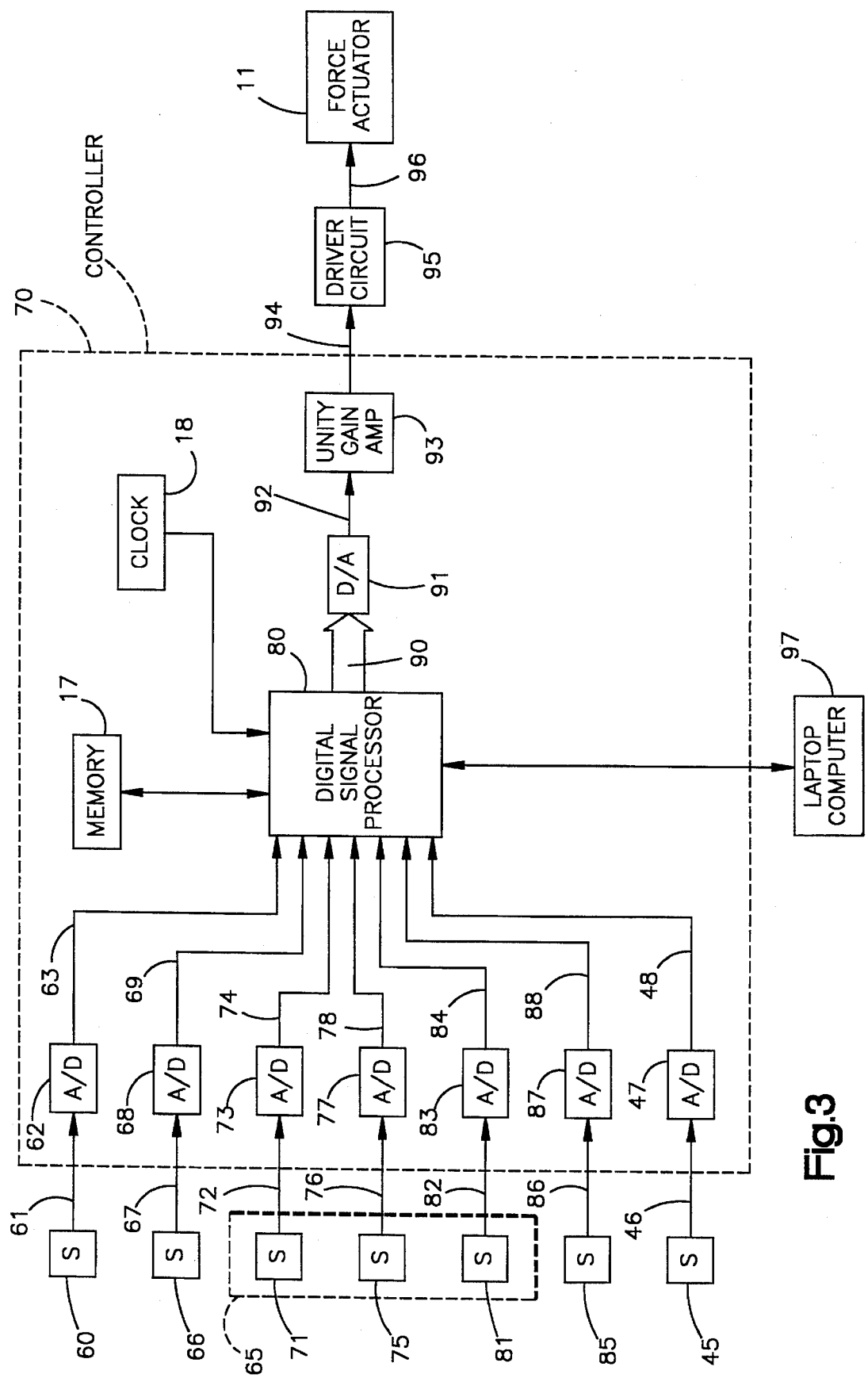
FIG. 3 is a schematic block diagram of a portion of the control apparatus in the vehicle suspension system of FIG. 2.

The outputs from the sensors 45, 60, 66, 85 are electrically connected to a controller 70 such as a microcomputer. The controller 70 is further connected to a plurality of center-of-gravity ("CG") sensors 65. These CG sensors 65 are typically located at or near the center of the vehicle and detect low frequency motions of the vehicle. Such CG sensors 65 include yaw sensors, lateral accelerometers, longitudinal accelerometers, etc. As shown in FIG. 3, the CG sensors 65 include a yaw rate sensor 71 which provides an electric signal on line 72 indicative of the yaw rate of the center of the vehicle, a lateral accelerometer 75 which provides an electric signal on line 76 indicative of the lateral acceleration of the center of the vehicle, and a longitudinal accelerometer 81 which provides an electric signal on line 82 indicative of the longitudinal acceleration of the center of the vehicle.

The controller 70 monitors data output from all the vehicle sensors to which it is connected and provides a desired force command signal on line 94. The desired force command signal on line 94 is applied to a driver circuit 95 which processes the signal on line 95 and provides the processed desired force command signal on line 96. The processed desired force demand signal on line 96 is used to control pressure in the chambers 28, 30 and, thereby, to control the displacement of the piston 20 for each of the vehicle corners. By controlling the pressure in the chambers 28, 30 and, in turn, displacement of the piston 20, the force "seen" by each corner is controlled. By controlling the corner forces, the heave, pitch, and roll modes of vehicle movement are controlled.

Figure 4:
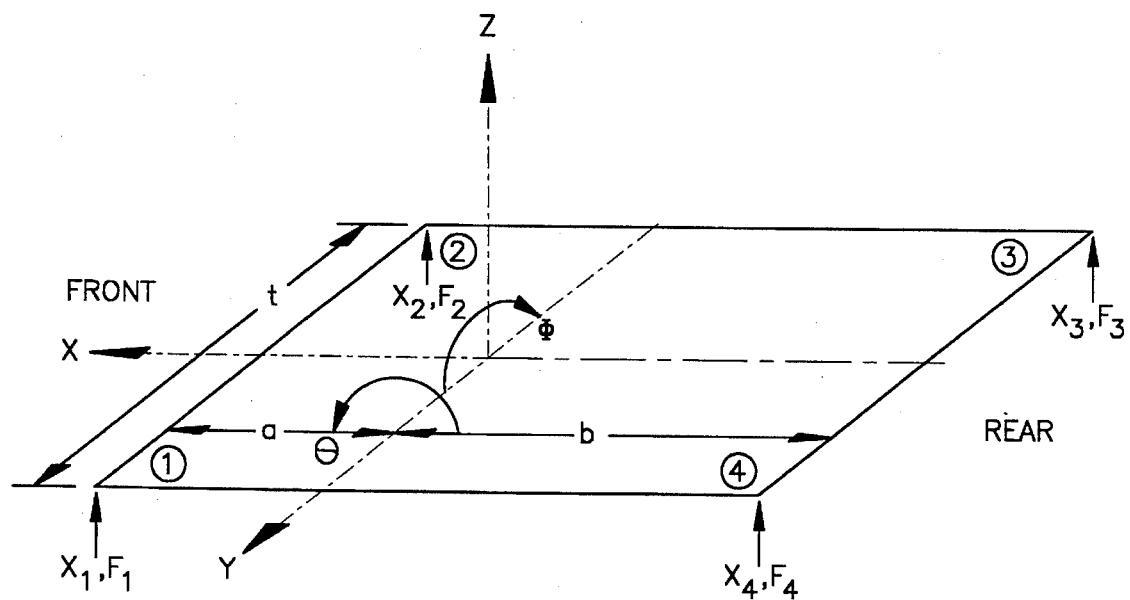
FIG. 4 is a schematic diagram representation of the effects of heave mode forces acting on a vehicle.
Figure 5:
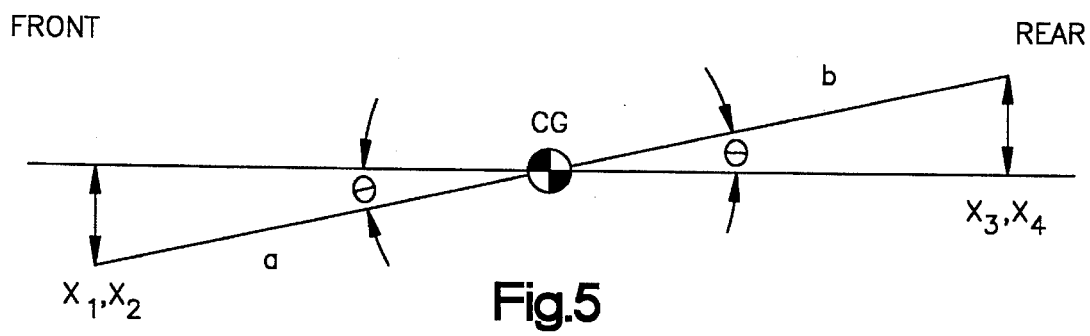
FIG. 5 is a schematic diagram representation of the effects of pitch mode forces acting on a vehicle.
Figure 6:
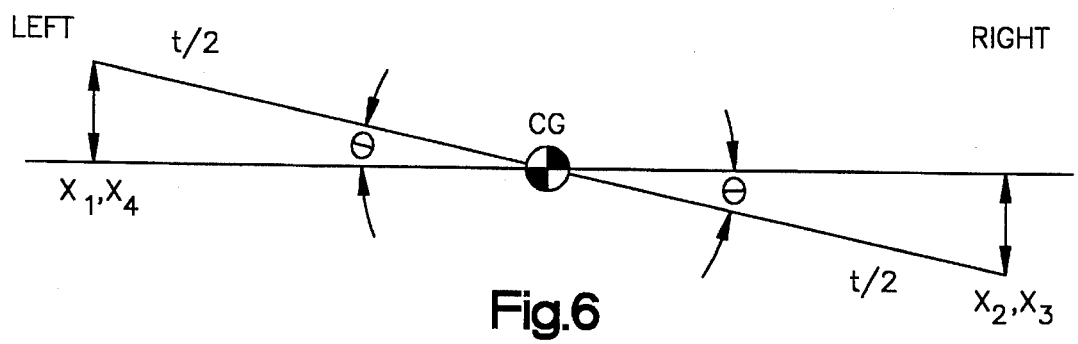
FIG. 6 is a schematic diagram representation of the effects of roll mode forces acting on a vehicle.

Referring to the diagrams of FIGS. 4–6, the effects of the heave, pitch, and roll mode forces acting on the vehicle are illustrated.

In the heave mode of vehicle movement as shown in FIG. 4, the average vertical displacement and the average vertical velocity are mathematically expressed as follows:

$$Z = \frac{1}{4} [X1 + X2 + X3 + X4]$$

AND $$\dot{Z} = \frac{1}{4} [\dot{X}1 + \dot{X}2 + \dot{X}3 + \dot{X}4]$$

wherein:

X1, X2, X3, X4 are the measured vertical displacements at the four corners of the vehicle;

$\dot{X}1, \dot{X}2, \dot{X}3, \dot{X}4$ are the calculated velocities at the four corners of the vehicle based on the measured accelerations at the corresponding corners of the vehicle.

The general second order equation which models the heave dynamics of the vehicle suspension system 10 is mathematically expressed as follows:

$$M\ddot{Z} + C_z \dot{Z} + K_z Z = 0$$

The specific force equation which models the heave dynamics of the vehicle suspension system 10 is mathematically expressed as follows:

$$F1 + F2 + F3 + F4 = M\ddot{Z}$$

and by rearrangement and substitution of the above equations, $$F1 + F2 + F3 + F4 = -C_z \dot{Z} K_z Z$$

wherein:
- M is the mass of the vehicle body;
- Z is the average vertical displacement;
- $\dot{Z}$ is the average velocity;
- $\ddot{Z}$ is the heave mode vertical acceleration;
- $C_z$ is the damping constant of heave mode;
- $K_z$ is the stiffness constant of heave mode;
- F1, F2, F3, F4 are the vertical dynamic forces applied by the four force actuators 11, 12, 13, 14 to the four corners of the vehicle body.

It should be noted that the above specific force equation which models the heave dynamics of the vehicle suspension system 10 is based upon the assumption that the parallel load coil springs are taking up the static weight of the unsprung mass, i.e., the vehicle chassis 15.

In the pitch mode of vehicle movement as shown in FIG. 5, the average angular displacement and the average angular velocity are mathematically expressed and derived as follows:

$$\Theta a = -X1; \; \Theta a = -X2; \; \Theta b = X3; \; \Theta b = X4;$$

OR $$\Theta = -\frac{1}{a} X1; \; \Theta = -\frac{1}{a} X2; \; \Theta = \frac{1}{b} X3; \; \Theta = \frac{1}{b} X4;$$

OR $$4\Theta = -\frac{1}{a}(X1 + X2) + \frac{1}{b}(X3 + X4)$$

OR $$\Theta = -\frac{1}{4a}(X1 + X2) + \frac{1}{4b}(X3 + X4)$$

AND $$\dot{\Theta} = -\frac{1}{4a}(\dot{X}1 + \dot{X}2) + \frac{1}{4b}(\dot{X}3 + \dot{X}4)$$

The general second order equation which models the pitch dynamics of the vehicle suspension system 10 is mathematically expressed as follows:

$$I_\Theta \ddot{\Theta} + C_\Theta \dot{\Theta} + K_\Theta \Theta = 0$$

The specific moment of force equation which models the pitch dynamics of the vehicle suspension system 10 is mathematically expressed as follows:

$$-a(F1 + F2) + b(F3 + F4) = I_\Theta \ddot{\Theta}$$

and by rearrangement and substitution of the above equations, $$-a(F1+F2)+b(F3+F4)=-C_\Theta \dot\Theta - K_\Theta \Theta$$

wherein:
- X1, X2 are the vertical displacements at the front of the vehicle;
- X3, X4 are the vertical displacements at the rear of the vehicle;
- $I_\Theta$ is the pitch moment of inertia of the vehicle body;
- $\Theta$ is the pitch mode angular displacement;
- $\Theta$ is the pitch mode angular velocity;
- $\Theta$ is the pitch mode angular acceleration;
- $C_\Theta$ is the damping constant of pitch mode;
- $K_\Theta$ is the stiffness constant of pitch mode;
- F1, F2, F3, F4 are the vertical dynamic forces applied by the four force actuators 11, 12, 13, 14 to the four corners of the vehicle body;
- a is the distance between the front and center of gravity of the vehicle;
- b is the distance between the rear and center of gravity of the vehicle.

In the roll mode of vehicle movement as shown in FIG. 6, the average angular displacement and the average angular velocity are mathematically expressed and derived as follows:

$$\Phi\left(\frac{t}{2}\right)=X1;\ \Phi\left(\frac{t}{2}\right)=X4;\ \Phi\left(\frac{t}{2}\right)=-X2;\ \Phi\left(\frac{t}{2}\right)=-X3$$

OR $$2t\Phi = X1 + X4 - X2 - X3$$

OR $$\Phi = \frac{1}{2t}(X1 - X2 + X4 - X3)$$

AND $$\dot\Phi = \frac{1}{2t}(\dot X1 - \dot X2 + \dot X4 - \dot X3)$$

The general second order equation which models the roll dynamics of the vehicle suspension system 10 is mathematically expressed as follows:

$$I_\Phi \ddot\Phi + C_\Phi \dot\Phi + K_\Phi \Phi = 0$$

The specific moment of force equation which models the roll dynamics of the vehicle suspension system 10 is mathematically expressed as follows:

$$M_\Phi = I_\Phi \ddot\Phi = \frac{t}{2}(F1+F4) - \frac{t}{2}(F2+F3)$$

OR $$M_\Phi = I_\Phi \ddot\Phi = \frac{t}{2}(F1-F2) + \frac{t}{2}(F4-F3)$$

wherein:
- X1, X4 are the vertical displacements at the left side of the vehicle;
- X2, X3 are the vertical displacements at the right side of the vehicle;
- $I_\Phi$ is the roll moment of inertia of the vehicle body;
- $\Phi$ is the roll mode angular displacement;
- $\Phi$ is the roll mode angular velocity;
- $\Phi$ is the roll mode angular acceleration;
- $C_\Phi$ is the damping constant of roll mode;
- $K_\Phi$ is the stiffness constant roll mode;
- F1, F2, F3, F4 are the vertical dynamic forces applied by the four force actuators 11, 12, 13, 14 to the four corners of the vehicle body;
- $M_\Phi$ is the total roll moment produced by the four force actuators 11, 12, 13, 14;
- t is the distance of the vehicle track.

The total roll moment produced by the four force actuators 11, 12, 13, 14 is divided between the front and rear of the vehicle and is mathematically expressed as follows:

$$M_\Phi = M_{\Phi F} + M_{\Phi R}$$

wherein:
- $M_{\Phi F}$ is the roll moment produced by the two front force actuators 11, 12;
- $M_{\Phi R}$ is the roll moment produced by the two rear force actuators 13, 14.

The terms $M_{\Phi F}$ and $M_{\Phi R}$ above are mathematically expressed as follows:

$$M_{\Phi F} = \frac{1}{2}M_\Phi(1+E) = \frac{t}{2}(F1-F2)$$

AND $$M_{\Phi R} = \frac{1}{2}M_\Phi(1-E) = \frac{t}{2}(F4-F3)$$

wherein:
- E is the roll moment distribution parameter.

The above two equations can be rewritten as follows:

$$F1 - F2 = \frac{1}{t}M_\Phi(1+E)$$

AND $$F4 - F3 = \frac{1}{t}M_\Phi(1-E)$$

Based upon the above two rewritten equations in the roll mode, the total roll moment is divided equally between the front and rear of the vehicle when the roll moment distribution parameter (E) is equal to zero. When the roll moment distribution parameter (E) is equal to −1, the roll moment is entirely on the rear of the vehicle. When the roll moment distribution parameter (E) is equal to +1, the roll moment is entirely on the front of the vehicle. Thus, more of the roll moment is on the rear than the front of the vehicle when the roll moment distribution parameter (E) has a value between −1 and zero, and more of the roll moment is on the front than the rear of the vehicle when the roll moment distribution parameter (E) has a value between zero and +1.

More specifically, the roll moment distribution parameter (E) is mathematically expressed as follows:

$$E = K_{YAW} \left[ |R| - \left| \frac{US}{(a+b)} \right| \right]$$

wherein:

$K_{YAW}$ is the gain constant associated with the yaw rate error of the vehicle;

R is the measured yaw rate of the vehicle;

U is the measured vehicle forward speed relative to ground of the vehicle;

a is the distance between the front and center of gravity of the vehicle;

b is the distance between the rear and center of gravity of the vehicle;

S is the measured steering input.

The term |R| is the absolute value of the measured yaw rate of the vehicle. The term |US/(a+b)| is the absolute value of the desired yaw rate of the vehicle. The difference between the two terms is the yaw rate error. The gain constant $K_{YAW}$ is empirically determined.

If the absolute value of the measured yaw rate is greater than the absolute value of the desired yaw rate, then the value of the roll moment distribution parameter (E) is greater than zero, indicating an oversteer condition during a steering maneuver as the vehicle is moving. When this occurs, the controller 70 responds by controlling the four force actuators 11, 12, 13, 14 accordingly to add unsteer to the vehicle. Unsteer is added to the vehicle until the roll moment distribution parameter (E) reaches zero which corresponds to a neutral steering condition of the vehicle.

If the absolute value of the measured yaw rate is less than the absolute value of the desired yaw rate, then the value of the roll moment distribution parameter (E) is less than zero, indicating an understeer condition during a steering maneuver as the vehicle is moving. When this occurs, the controller 70 responds to add oversteer to the vehicle by controlling the four force actuators 11, 12, 13, 14 accordingly to add oversteer to the vehicle. Oversteer is added to the vehicle until the roll moment distribution parameter (E) reaches zero which corresponds to a neutral steering condition of the vehicle.

The use of the roll moment distribution parameter (E) allows the controller 70 to control operation of the four force actuators 11, 12, 13, 14 in a closed loop. The closed loop arrangement includes the vehicle forward speed sensor 45 which provides its output signal on line 46, the steering rack displacement sensor 85 which provides its output signal on line 86, and the yaw rate sensor 71 which provides its output signal on line 72. The controller 70 monitors the signals on lines 46, 72, 86 and determines the value of the roll moment distribution parameter (E) in accordance with the equation above which defines the roll moment distribution parameter (E) in terms of the speed of forward movement (U) of the vehicle, the steering input (S) to the vehicle, and the yaw rate (R) of the vehicle. The controller 70 then uses the value of the roll moment distribution parameter (E) to determine the force actuator control signal to be applied to the associated force actuator at each corner of the vehicle.

Although the roll moment distribution parameter (E) can have any value between −1 and +1, it is expected that the roll moment distribution parameter (E) will be limited so that the tire on each wheel of the vehicle will maintain at all times some force on the ground whenever vehicle roll occurs. The tire on each wheel is always maintained with sufficient force on the ground so that braking or acceleration of the vehicle can be effected during vehicle roll.

Referring to FIG. 3, each of the output signals on lines 46, 61, 67, 72, 76, 82, 86 from the remote sensors 45, 60, 66, 71, 75, 81, 85 is digitized within a respective one of a number of analog-to-digital ("A/D") converters 47, 62, 68, 73, 77, 83, 87 located in the controller 70. The structure and operation of A/D converters are known and, therefore, will not be described. The digitized representation of the output signal of each of the sensors 45, 60, 66, 71, 75, 81, 85 appears on lines 48, 63, 69, 74, 78, 84, 88, respectively. A digital signal processor 80 receives the digitized output signal of each of the A/D converters 47, 62, 68, 73, 76, 82, 87. Preferably, the digital signal processor 80 is a Model No. TMS320C25 (ROM version) or Model No. TMS320E25 (EPROM version) manufactured by Texas Instruments.

A system memory 17 includes a program memory portion, a data memory portion, and an I/O memory portion. The program memory portion is a non-volatile type of memory such as EPROM. The program memory portion contains all system program control, messages, and non-volatile system parameters. Constant values, such as the constant values used in the heave, pitch, and roll mode equations expressed hereinabove, are preferably stored in the program memory portion of the system memory 17. The data memory portion is a volatile type of memory such as RAM. The I/O memory portion interfaces to analog-to-digital converters, digital-to-analog converters, and any discrete I/O. A system clock 18 provides a timing signal to the digital signal processor 80 for operating the digital signal processor 80 in accordance with the control steps of the present invention.

An optional MS-DOS compatible laptop computer 97 is connectable, through an RS-232C communication link, to the digital signal processor 80. The laptop computer 97 graphically monitors real-time system activity and provides a means to change operation characteristics of the system such as by changing filter constants. The laptop computer 97 provides an interactive interface between the user and the digital signal processor 80 during system performance testing. Also, the laptop computer 97 interrogates the system for errors during system diagnostics.

The digital signal processor 80 processes the digitized representation of the output signal from each of the sensors 45, 60, 66, 71, 75, 81, 85 and provides the digitized representation of a force actuator control signal on line 90 to control the force actuator 11. The digital signal processor 80 processes the output signals from the sensors 45, 60, 66, 71, 75, 81, 85 according to control steps sequenced in accordance with the present invention to provide the digitized force actuator control signal on line 90. The specific value of the digitized force actuator control signal on line 90 at any given moment in time depends upon the control steps of the algorithm which includes parameters of the particular force actuator construction.

More specifically, the digital signal processor 80 calculates the amount current required for the force actuator 11 and provides a proportional digital word indicative thereof as an output signal on line 90. A digital-to-analog ("D/A") converter 91 transforms the digital output signal on line 90 into a corresponding voltage output signal on line 92 which, in turn, is buffered with a unitary gain amplifier 93 to provide the force actuator control signal appearing on line 94. A driver circuit 95 mounted in the vicinity of the force actuator 11 receives the force actuator control signal on line 94 and provides a proportional modified force actuator control signal on line 96. The modified force actuator control signal on line 96 is applied to the torque motor 56 to control the force actuator 11, as already described hereinabove. The spring rate and the damping rate provided by the force actuator 11 vary as a function of the amount of current applied to the torque motor 56.

It will be apparent to one of ordinary skill in the art that the carrying out of the control steps of the algorithm of the present invention can be accomplished by equivalent means such as a microprocessor or a combination of discrete analog circuits and discrete digital circuits.

Figure 7:
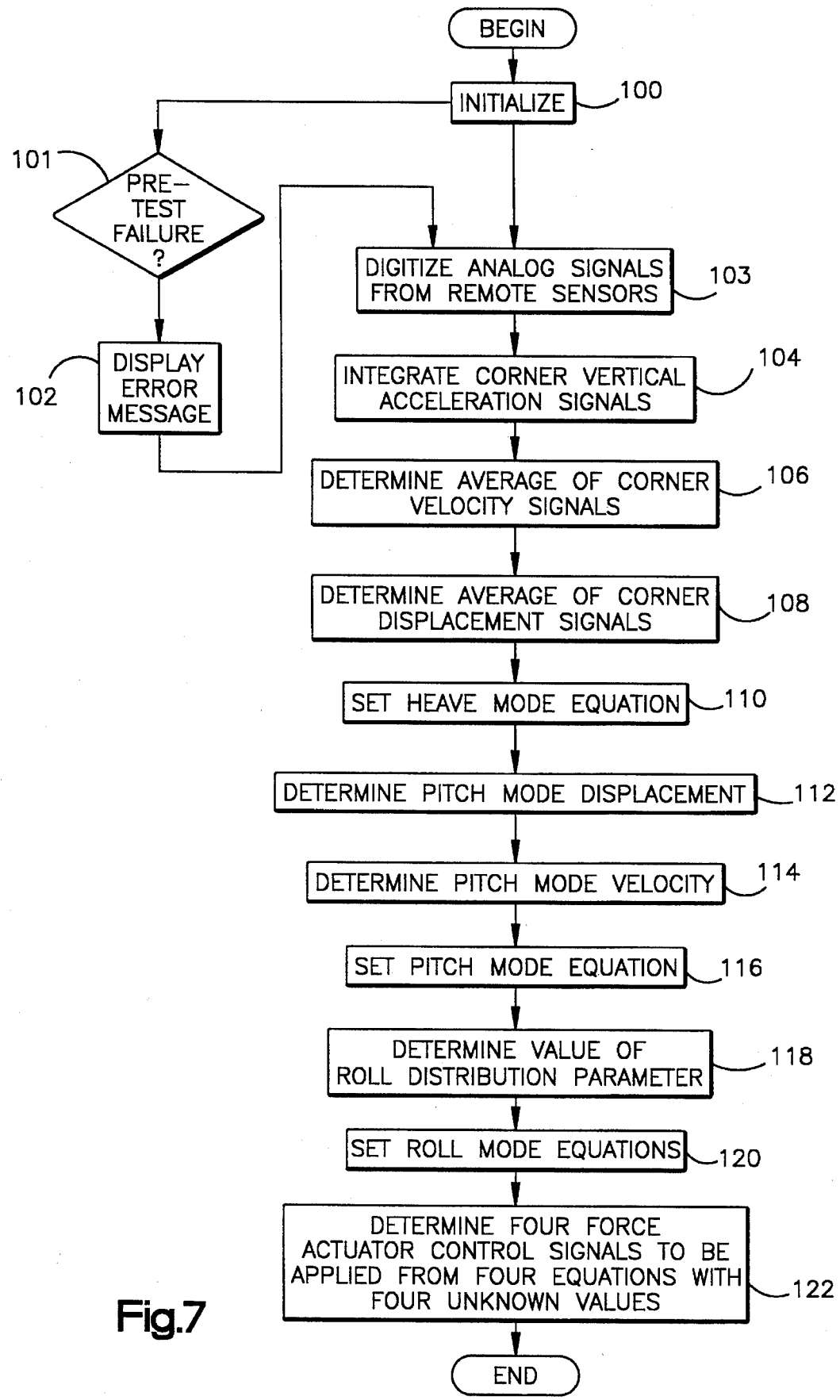
FIGS. 7 and 8 are flow charts of a control process for the vehicle active suspension system of FIG. 1.

Referring to FIG. 7, a flow chart is depicted illustrating the control steps executed in accordance with the present invention. These control steps are repeatedly executed every predetermined time interval after the digital signal processor 80 is actuated and initialized. For purposes of describing the present invention, the sequencing of the control steps in accordance with the present invention will be described with reference to FIG. 7.

In step 100, the electronics including the digital signal processor 80 and the memory 17 are initialized. The digitized signal processor 80 performs a plurality of memory tests, determines whether all circuits are present and functional, and determines whether the program memory portion of the memory 17 is functioning correctly. Such pre-tests are well known in the art and are referred to as system self-diagnostic tests. In step 101, a determination is made if a pre-test failed. If a pre-test failure has occurred in step 101, an error message is displayed, as shown in step 102, through the laptop computer 97. The program then proceeds to step 103. If no pre-test failed has occurred in step 101, the program proceeds directly to step 103. In step 103, the output signals from the sensors 45, 60, 66, 71, 75, 81, 85 are digitized with their respective A/D converters 47, 62, 68, 73, 77, 83, 87 to provide their respective signals on respective lines 48, 63, 69, 74, 78, 84, 88. The remote sensors associated with the other three corners of the vehicle are digitized in the same way.

In step 104, the output signal of each vertical acceleration sensor including the sensor 60 is integrated to provide a signal indicative of the relative velocity between the vehicle body 15 and ground at the respective corner of the vehicle. The velocity signals are designated $\dot{X}1, \dot{X}2, \dot{X}3, \dot{X}4$ in the mode equations above.

The program proceeds to step 106 in which the controller 70 determines the average value of the four velocity signals $\dot{X}1, \dot{X}2, \dot{X}3, \dot{X}4$. This average value is designated $\dot{Z}$ in the mode equations above. In step 108, the controller 70 determines the average value of the four force actuator displacement signals, designated as X1, X2, X3, X4 in the mode equations above. This average value is designated Z in the mode equations above. The heave mode equation is set forth in step 110 wherein $F1+F2+F3+F4 = -C_z\dot{Z}K_zZ$.

In step 112, controller 70 determines the pitch mode angular displacement $\Theta$ using the mode equations above. Also, in step 114, the pitch mode angular velocity $\dot{\Theta}$ is determined using the mode equations above. The pitch mode equation is set forth in step 116 wherein $-a(F1+F2)+b(F3+F4)=-C_\Theta\dot{\Theta}-K_\Theta\Theta$.

In step 118, the roll moment distribution parameter (E) is determined. The roll mode equations are set in step 120 wherein $1/_rM_\Phi(1+E)=F1-F2$ and $1/_rM_\Phi(1-E)=F4-F3$.

The program then proceeds to step 122. In step 122, the controller 70 solves the four equations contained in the heave, pitch, and roll mode equations discussed hereinabove for the four unknown force actuator control signals. Each of the force actuator control signals is applied to the associated force actuator at the respective corner of the vehicle.

It should be apparent from the description hereinabove that an algorithm based upon modal control principles is applied to a force actuator control arrangement so that independent dynamics can be proscribed for the three rigid body modes (i.e., heave mode, pitch mode, and roll mode) of movement of the suspended mass (vehicle chassis) of the vehicle. By being able to proscribe independent dynamics for the three rigid body modes of the suspended mass of the vehicle, the vehicle can, for example, be soft in heave mode and relatively stiff in pitch and roll modes. Moreover, each force actuator is regulated in a closed loop control arrangement and can react independently to reject road noise and thereby not excite any mode of movement.

Also, it should be apparent from the description hereinabove that a well defined roll moment distribution is established by which roll mode resisting forces are divided between the front and rear of the vehicle to influence vehicle handling dynamics. More specifically, a roll moment distribution parameter is introduced so that the heave mode, pitch mode, and roll mode equations can be solved simultaneously to obtain the four force actuator control signals for the four force actuators at the four corners of the vehicle. The four force actuators are controlled so that the roll moment distribution is divided between the front and rear of the vehicle depending upon the value of the roll moment distribution parameter.

By controlling the roll moment distribution of the vehicle in accordance with the present invention, as described hereinabove, neutral steering of the vehicle can be maintained during operation of the vehicle. The neutral steering characteristics of the vehicle are maintained by the closed loop control of the four force actuators 11, 12, 13, 14 as described hereinabove.

The four force actuator forces F1, F2, F3, F4 determined above are modal-related forces and are the result of solving four modal equations in four unknowns. These four modal-related forces are the desired forces to be applied by the four force actuators 11, 12, 13, 14. However, it is contemplated that the total desired forces to be applied by the four force actuators 11, 12, 13, 14 may depend upon more than just the modal-related forces. As an example, the total desired force to be applied by each force actuator may include feed forward force terms such as a longitudinal acceleration compensation force and a lateral acceleration compensation force which are fed forward to produce forces necessary to balance inertia forces acting on the vehicle body.

The total desired force to be applied by each of the force actuators 11, 12, 13, 14 is mathematically expressed as follows:

$$F1_{TOT}=F1+F1_{LAT}+F1_{LON}$$

$$F2_{TOT}=F2+F2_{LAT}+F2_{LON}$$

$$F3_{TOT}=F3+F3_{LAT}+F3_{LON}$$

$$F4_{TOT}=F4+F4_{LAT}+F4_{LON}$$

wherein:

$F1_{TOT}$, $F2_{TOT}$, $F3_{TOT}$, $F4_{TOT}$ are the total desired forces to be applied by the four force actuators 11, 12, 13, 14;

F1, F2, F3, F4 are modal-related force components as determined hereinabove;

$F1_{LAT}$, $F2_{LAT}$, $F3_{LAT}$, $F4_{LAT}$ are the lateral acceleration compensation force components;

$F1_{LON}$, $F2_{LON}$, $F3_{LON}$, $F4_{LON}$ are the longitudinal acceleration compensation force components.

The longitudinal acceleration compensation force components and the lateral acceleration compensation force components are obtained in a similar manner using the pitch and roll mode equations defined hereinabove and are derived and mathematically expressed as follows:

$$F1_{LAT} = \frac{h}{2t} F_{LAT}(1+E)$$

$$F2_{LAT} = \frac{-h}{2t} F_{LAT}(1+E)$$

$$F3_{LAT} = \frac{h}{2t} F_{LAT}(1-E)$$

$$F4_{LAT} = \frac{-h}{2t} F_{LAT}(1-E)$$

AND $$F1_{LON} = F_{LON} \frac{h}{2(a+b)}$$

$$F2_{LON} = F_{LON} \frac{h}{2(a+b)}$$

$$F3_{LON} = -F_{LON} \frac{h}{2(a+b)}$$

$$F4_{LON} = -F_{LON} \frac{h}{2(a+b)}$$

wherein:

$F_{LAT}$ is the force component acting on the vehicle due to lateral acceleration;

$F_{LON}$ is the force component acting on the vehicle due to longitudinal acceleration;

t is the distance of the vehicle track;

h is the vertical distance between the center of gravity of the vehicle and ground;

a is the distance between the front and center of gravity of the vehicle;

E is the roll moment distribution parameter.

The force components $F_{LAT}$ and $F_{LON}$ are mathematically expressed as follows:

$$F_{LAT} = \frac{t}{2h}(F1_{LAT} + F4_{LAT}) - \frac{t}{2h}(F2_{LAT} - F3_{LAT})$$

$$F_{LON} = \frac{a}{h}(F1_{LON} + F2_{LON}) - \frac{b}{h}(F3_{LON} + F4_{LON})$$

The force component $F_{LAT}$ above is substituted into the four equations above for $F1_{LAT}$, $F2_{LAT}$, $F3_{LAT}$, $F4_{LAT}$, and then solved for these four unknown values. Similarly, the force component $F_{LON}$ above is substituted into the four equations above for $F1_{LON}$, $F2_{LON}$, $F3_{LON}$, $F4_{LON}$ and then solved for these four unknown values. It should be noted that the above equation for the force component $F_{LON}$ is based upon the assumption that longitudinal acceleration effects are equal on the left and right sides of the vehicle.

Figure 8:
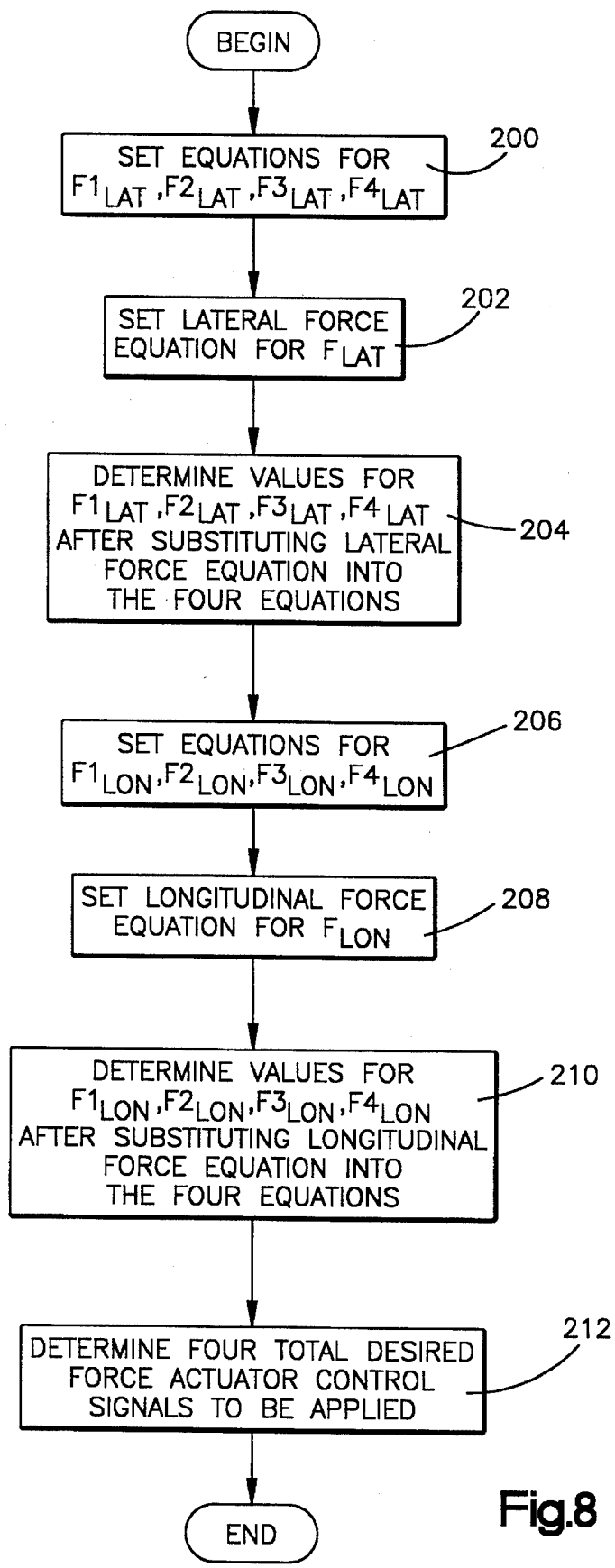

Referring to FIG. 8, a flow chart is depicted illustrating the control steps associated with determining the lateral acceleration compensation force components $F1_{LAT}$, $F2_{LAT}$, $F3_{LAT}$, $F4_{LAT}$ and the longitudinal acceleration compensation force components $F1_{LON}$, $F2_{LON}$, $F3_{LON}$, $F4_{LON}$ and thereby determining the total desired forces to be applied by the four force actuators 11, 12, 13, 14. In step 200, the four lateral acceleration compensation force component equations for $F1_{LAT}$, $F2_{LAT}$, $F3_{LAT}$, $F4_{LAT}$ are set forth. In step 202, the lateral force component equation for $F_{LAT}$ is set forth. The program then proceeds to step 204 in which the lateral force component equation for $F_{LAT}$ is substituted into each of the four lateral acceleration compensation force component equations for $F1_{LAT}$, $F2_{LAT}$, $F3_{LAT}$, $F4_{LAT}$. The four equations for $F1_{LAT}$, $F2_{LAT}$, $F3_{LAT}$, $F4_{LAT}$ in four unknowns are then solved to obtain values for $F1_{LAT}$, $F2_{LAT}$, $F3_{LAT}$, $F4_{LAT}$.

Similarly, in step 206, the four longitudinal acceleration compensation force component equations for $F1_{LON}$, $F2_{LON}$, $F3_{LON}$, $F4_{LON}$ are set forth. In step 208, the longitudinal force component equation for $F_{LON}$ is set forth. The program then proceeds to step 210 in which the longitudinal force component equation for $F_{LON}$ is substituted into each of the four longitudinal acceleration compensation force component equations for $F1_{LON}$, $F2_{LON}$, $F3_{LON}$, $F4_{LON}$. The four equations for $F1_{LON}$, $F2_{LON}$, $F3_{LON}$, $F4_{LON}$ in four unknowns are then solved to obtain values for $F1_{LON}$, $F2_{LON}$, $F3_{LON}$, $F4_{LON}$.

The program then proceeds to step 212. In step 212, the four total desired force actuator control signals $F1_{TOT}$, $F2_{TOT}$, $F3_{TOT}$, $F4_{TOT}$ are determined. The values for $F1_{TOT}$, $F2_{TOT}$, $F3_{TOT}$, $F4_{TOT}$ are determined by summing the terms $F1_{LAT}$, $F2_{LAT}$, $F3_{LAT}$, $F4_{LAT}$ and $F1_{LON}$, $F2_{LON}$, $F3_{LON}$, $F4_{LON}$, respectively, and then adding these sums to the modal-related forces F1, F2, F3, F4, respectively, as already mathematically expressed hereinabove.

From the above description of the invention, those skilled in the art will perceive improvements, changes and modifications. Such improvements, changes and modifications within the skill of the art to which the present invention relates are intended to be covered by the appended claims.

Having described the invention, the following is claimed:

1. An apparatus for controlling a force actuator connected between a vehicle body and each vehicle wheel, the vehicle having a pair of front wheels and a pair of rear wheels, said apparatus comprising:

a position sensor for sensing displacement between the vehicle body and each vehicle wheel and for providing a position signal indicative thereof;

an acceleration sensor for sensing vertical inertial acceleration of the vehicle body relative to ground at each vehicle wheel and for providing an absolute inertial acceleration signal indicative of vertical inertial acceleration of the vehicle body at each vehicle wheel;

processing means including means for determining an absolute inertial velocity signal based on each absolute inertial acceleration signal;

said processing means including means for determining a first roll moment on the rear of the vehicle and a second moment on the front of the vehicle, said first and second roll moment having a roll moment distribution parameter;

said processing means including means for processing first and second moments and said position and absolute inertial velocity signals at the vehicle wheels to provide an absolute force actuator control signal at each vehicle wheel, the absolute force actuator control signals for the rear wheels varying as a function of said position and absolute inertial velocity signals and the roll moment on the rear wheels of the vehicle, the absolute force actuator control signals for the front wheels varying as a function of said position and absolute inertial velocity signals and the roll moment on the front wheels of the vehicle; and means for applying said absolute force actuator control signal at each vehicle wheel to the associated force actuator to control operation of the force actuator for vehicle handling.

2. An apparatus according to claim 1 further comprising regulating means for providing a closed loop arrangement for enabling said force actuator control signal at each vehicle wheel to be regulated during operation thereof.

3. An apparatus according to claim 2 wherein said regulating means comprises (i) a steering rack displacement sensor for sensing a steering input and for providing a steering signal indicative thereof, and (ii) a speed sensor for sensing forward speed of the vehicle relative to ground and for providing a speed signal indicative thereof.

4. An apparatus according to claim 3 wherein said processing means includes means for determining a desired yaw rate signal which varies as a function of said steering signal and said speed signal.

5. An apparatus according to claim 4 wherein said regulating means comprises a yaw rate sensor for sensing yaw rate of the vehicle and for providing a yaw rate signal indicative thereof, said processing means including means for (i) determining a difference signal between said yaw rate signal and said desired yaw rate signal, and (ii) processing said difference signal such that said force actuator control signal at each wheel varies as a function of said difference signal.

6. An apparatus according to claim 5 wherein said difference signal is limited to limit the force actuator control signal at each wheel such that the tire at each wheel will maintain at all times at least a predetermined force on the ground during vehicle roll, said predetermined force on the ground being sufficient to allow braking or acceleration of the vehicle during vehicle roll.

7. The apparatus of claim 5 wherein said roll moment distribution parameter is determined in response to only the yaw rate signal and the desired yaw rate signal.

8. The apparatus of claim 5 wherein said roll moment distribution parameter is determined in response to only said difference signal between the yaw rate signal and the desired yaw rate signal.

9. An apparatus according to claim 1 wherein said processing means includes a digital signal processor.

10. An apparatus according to claim 1 further comprising a lateral acceleration sensor for sensing lateral acceleration of the vehicle body relative to ground and for providing a lateral acceleration signal indicative thereof.

11. An apparatus according to claim 10 wherein said processing means includes (i) means for processing said lateral acceleration signal to provide a lateral acceleration compensation force term, and (ii) means for processing said lateral acceleration compensation force term to influence said force actuator control signal at each vehicle wheel.

12. An apparatus according to claim 1 further comprising a longitudinal acceleration sensor for sensing longitudinal acceleration of the vehicle body relative to ground and for providing a longitudinal acceleration signal indicative thereof.

13. An apparatus according to claim 12 wherein said processing means includes (i) means for processing said longitudinal acceleration signal to provide a longitudinal acceleration compensation force term, and (ii) means for processing said longitudinal acceleration compensation force term to influence said force actuator control signal at each vehicle wheel.

14. An apparatus according to claim 1 wherein said means for applying said force actuator control signal at each vehicle wheel includes a drive circuit.

15. A method for controlling a vehicle suspension system having a force actuator connected between a vehicle body and each vehicle wheel, the vehicle having a pair of front wheels and a pair of rear wheels, said method comprising the steps of:

sensing displacement between the vehicle body and each vehicle wheel and providing a position signal indicative thereof;

sensing vertical inertial acceleration of the vehicle body relative to ground at each vehicle wheel and providing an absolute inertial acceleration signal indicative of vertical inertial acceleration of the vehicle body at each vehicle wheel;

determining an absolute inertial velocity signal based on each absolute inertial acceleration signal;

determining a first roll moment on the rear of the vehicle and a second roll moment on the front of the vehicle including the steps of determining roll modal forces which act on the vehicle body and which vary as a function of the position and absolute inertial velocity signals at the vehicle wheels, said first and second roll moment having a roll moment distribution parameter;

providing an absolute force actuator control signal for each vehicle wheel which varies as a function of the roll modal forces, the absolute force actuator control signals for the rear wheels varying as a function of the roll moment on the rear wheels of the vehicle, the absolute force actuator control signals for the front wheels varying as a function of the roll moment on the front wheels of the vehicle;

applying the absolute force actuator control signal for each vehicle wheel to the associated force actuator to control operation of the force actuator for vehicle handling; and continuously changing the roll resisting force between the front and rear of the vehicle as the absolute force actuator control signals are being applied.

16. A method according to claim 15 further comprising the steps of (i) sensing a steering input and providing a steering signal indicative thereof, and (ii) sensing forward speed of the vehicle relative to ground and providing a speed signal indicative thereof.

17. A method according to claim 16 further comprising the step of determining a desired yaw rate signal which varies as a function of the steering signal and the speed signal.

18. A method according to claim 17 further comprising the steps of (i) sensing yaw rate of the vehicle and providing a yaw rate signal indicative thereof, (ii) determining a difference signal between the yaw rate signal and the desired yaw rate signal, and (iii) processing the difference signal such that the force actuator control signal at each wheel varies as a function of the difference signal.

19. A method according to claim 18 further comprising the step of limiting the difference signal and thereby to limit the force actuator control signal at each wheel such that the tire at each wheel will maintain at all times at least some force on the ground to allow braking or acceleration of the vehicle during vehicle roll.

20. The method of claim 18 wherein said roll moment distribution parameter is determined in response to only the yaw rate signal and the desired yaw rate signal.

21. The method of claim 18 wherein said roll moment distribution parameter is determined in response to only said difference signal between the yaw rate signal and the desired yaw rate signal.

22. A method according to claim 15 further comprising the step of sensing longitudinal acceleration of the vehicle body relative to ground and providing a longitudinal acceleration signal indicative thereof.

23. A method according to claim 22 further comprising the steps of (i) determining a longitudinal acceleration compensation force term which varies as a function of the longitudinal acceleration signal, and (ii) processing the longitudinal acceleration compensation force term to influence the force actuator control signal at each vehicle wheel.

24. A method according to claim 15 wherein the step of continuously changing the roll resisting force includes the step of continuously changing the distribution of the first and second roll moments between the front and rear of the vehicle.

25. A method according to claim 15 further comprising the step of sensing lateral acceleration of the vehicle body relative to ground and providing a lateral acceleration signal indicative thereof.

26. A method according to claim 25 further comprising the steps of (i) determining a lateral acceleration compensation force term which varies as a function of the lateral acceleration signal, and (ii) processing the lateral acceleration compensation force term to influence the force actuator control signal at each vehicle wheel.

27. A method for controlling a vehicle suspension system having a force actuator connected between a vehicle body and each vehicle wheel, the vehicle having a pair of front wheels and a pair of rear wheels, said method comprising the steps of:

sensing displacement between the vehicle body and each vehicle wheel and providing a position signal indicative thereof;

sensing vertical inertial acceleration of the vehicle body relative to ground at each vehicle wheel and providing an absolute inertial acceleration signal indicative of vertical inertial acceleration of the vehicle body at each vehicle wheel;

determining an absolute inertial velocity signal based on each absolute inertial acceleration signal;

determining a first roll moment on the rear of the vehicle and a second roll moment on the front of the vehicle including the steps of determining roll modal forces which act on the vehicle body and which vary as a function of the position and absolute inertial velocity signals at the vehicle wheels, said first and second roll moment having a roll moment distribution parameter, wherein said roll moment distribution parameter is determined without regard to said displacement between the vehicle body and a single vehicle wheel and without regard to said vertical acceleration for the vehicle body relative to ground at a single vehicle wheel;

providing an absolute force actuator control signal for each vehicle wheel which varies as a function of the roll modal forces, the absolute force actuator control signals for the rear wheels varying as a function of the roll moment on the rear wheels of the vehicle, the absolute force actuator control signals for the front wheels varying as a function of the roll moment on the front wheels of the vehicle;

applying the absolute force actuator control signal for each vehicle wheel to the associated force actuator to control operation of the force actuator for vehicle handling; and continuously changing the roll resisting force between the front and rear of the vehicle as the absolute force actuator control signals are being applied.

28. An apparatus for controlling a force actuator connected between a vehicle body and each vehicle wheel, the vehicle having a pair of front wheels and a pair of rear wheels, said apparatus comprising:

a position sensor for sensing displacement between the vehicle body and each vehicle wheel and for providing a position signal indicative thereof;

an acceleration sensor for sensing vertical inertial acceleration of the vehicle body relative to ground at each vehicle wheel and for providing an absolute inertial acceleration signal indicative of vertical inertial acceleration of the vehicle body at each vehicle wheel;

processing means including means for determining an absolute inertial velocity signal based on each absolute inertial acceleration signal;

said processing means including means for determining a first roll moment on the rear of the vehicle and a second moment on the front of the vehicle, said first and second roll moment having a roll moment distribution parameter, wherein said roll moment distribution parameter is determined without regard to said displacement between the vehicle body and a single vehicle wheel and without regard to said vertical acceleration of the vehicle body relative to ground at a single vehicle wheel;

said processing means including means for processing first and second moments and said position and absolute inertial velocity signals at the vehicle wheels to provide an absolute force actuator control signal at each vehicle wheel, the absolute force actuator control signals for the rear wheels varying as a function of said position and absolute inertial velocity signals and the roll moment on the rear wheels of the vehicle, the absolute force actuator control signals for the front wheels varying as a function of said position and absolute inertial velocity signals and the roll moment on the front wheels of the vehicle; and means for applying said absolute force actuator control signal at each vehicle wheel to the associated force actuator to control operation of the force actuator for vehicle handling.

* * * * *